United States Patent

Maringer et al.

Patent Number: 5,149,107
Date of Patent: Sep. 22, 1992

[54] ELASTOMER ENERGIZED SEALING AND EXCLUSION DEVICE

[75] Inventors: Martin M. Maringer, Fort Wayne, Ind.; Henry A. Traub, Palisades; John W. Kosty, Fountain Valley, both of Calif.; O. Theodor Mack, Fort Wayne, Ind.

[73] Assignee: W. S. Shamban & Company, Santa Monica, Calif.

[21] Appl. No.: 746,795

[22] Filed: Aug. 12, 1991

Related U.S. Application Data

[63] Continuation of Ser. No. 330,105, Mar. 29, 1989, abandoned.

[51] Int. Cl.⁵ .......................... F16J 15/24; F16J 15/32
[52] U.S. Cl. ................................. 277/165; 277/138; 277/148; 277/152; 277/176; 277/206 A; 277/214; 277/215
[58] Field of Search ............... 277/141, 148, 152, 165, 277/193, 138, 215, 177, 206 A, 207 R, 208, 176, 214, 215, 173

[56] References Cited

U.S. PATENT DOCUMENTS

| | | | |
|---|---|---|---|
| 3,144,256 | 8/1964 | Wright | 277/208 |
| 3,198,531 | 8/1965 | Brenneke | 277/215 |
| 4,448,429 | 5/1984 | Thomas | 277/165 |
| 4,709,932 | 12/1987 | Edlund et al. | 277/165 |
| 4,723,782 | 2/1988 | Müller | 277/165 |
| 4,819,952 | 4/1989 | Edlund | 277/165 |
| 4,953,876 | 9/1990 | Müller | 277/177 X |
| 4,995,623 | 2/1991 | Wada et al. | 277/215 X |

FOREIGN PATENT DOCUMENTS 2177464 1/1987 United Kingdom ............... 277/165

Primary Examiner—Allan N. Shoap
Assistant Examiner—James K. Folker
Attorney, Agent, or Firm—Baker & Daniels

[57] ABSTRACT

A seal assembly having an exclusion portion and a seal portion so that the assembly functions as both a sealing and exclusion device. The seal portion includes surfaces which are shaped to provide chambers that create vortexes which reduce leakage of fluid or gas from the system. The exclusion portion, in combination with the seal portion, is shaped to prevent entry of contaminants into the system being sealed and to reduce extrusion of the excluder portion of the seal. Three different embodiments of the invention are disclosed using different elastomer energizer configurations.

9 Claims, 2 Drawing Sheets

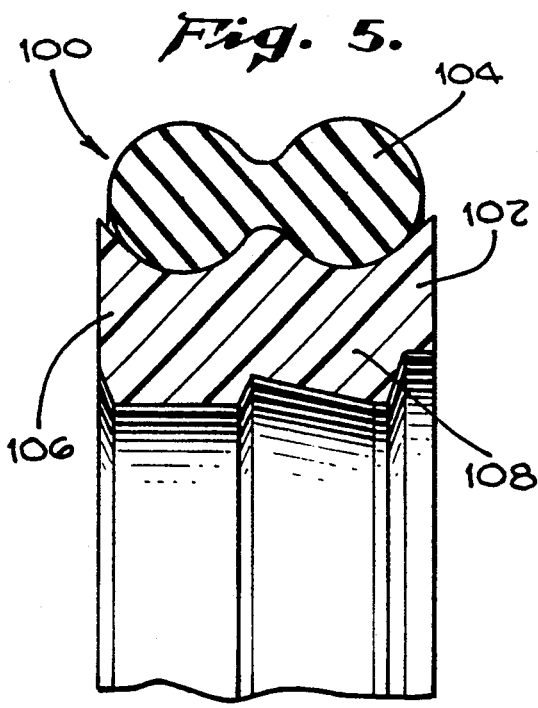
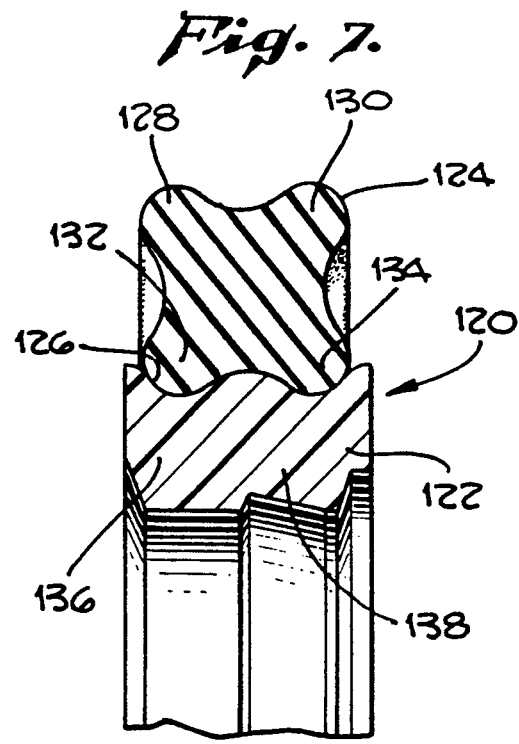
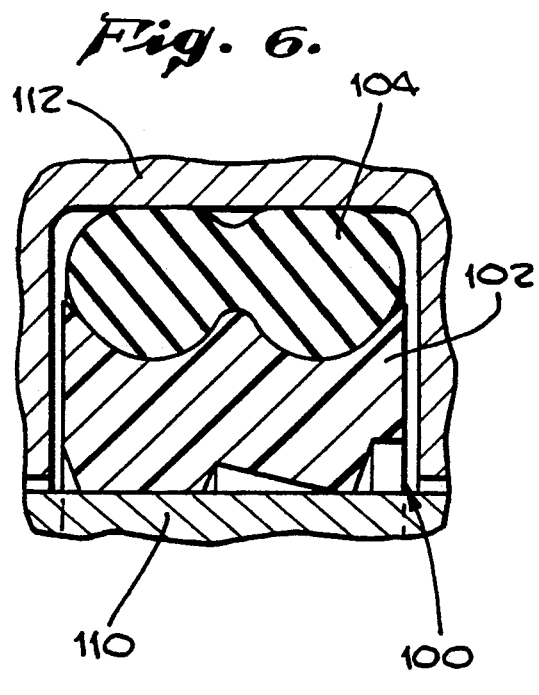
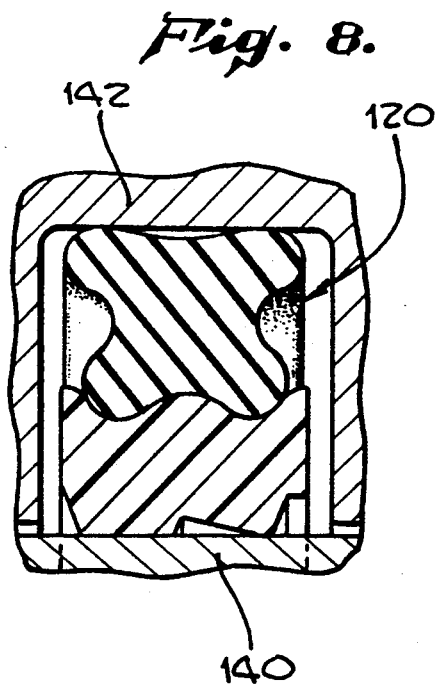

ELASTOMER ENERGIZED SEALING AND EXCLUSION DEVICE

This is a continuation of application Ser. No. 07/330,105, filed Mar. 29, 1989 now abandoned.

1. FIELD OF THE INVENTION

The present invention relates generally to dual purpose seal assemblies which function as both sealing and exclusion devices. More particularly, the present invention relates to an improved configuration for an elastomer energized seal assembly for use as a seal and exclusion device in hydraulic or pneumatic systems.

2. DESCRIPTION OF RELATED ART

Hydraulic and pneumatic linear actuators require some type of rod and piston sealing system to prevent leakage of hydraulic oil or gas, such as air or nitrogen. Unless a sealing system is used, fluid will leak past the annular clearance between the rod and rod gland or between the piston and cylinder bore. In addition, some type of scraper or exclusion device is often needed between the seal and the atmosphere side of the seal gland in order to prevent ingression of contamination into the hydraulic or pneumatic system. Separate seal assemblies and scraper assemblies can be located adjacent to each other in order to provide the necessary seal/exclusion device. However, single seal assemblies have been developed in which the seal and exclusion functions are incorporated into a single device.

U.S. Pat. Nos. 4,723,782 and 4,709,932 are exemplary of double wiper seal arrangements wherein a single seal element includes both an exclusion portion and a sealing portion. The seal arrangements are generally elastomer energized seal devices wherein the seal ring is biased into sealing engagement by an elastomer ring. The seal ring itself includes a sealing portion for preventing escape of hydraulic fluid or gas from the system and an exclusion portion which prevents entry of contaminants into the system.

Although the present double wiper seal designs have been found well suited for their intended purpose, there is a continuing need to develop new seal designs which provide enhanced sealing and/or exclusion characteristics.

SUMMARY OF THE INVENTION

In accordance with the present invention, a seal assembly is provided for sealing the annular space between first and second reciprocating members present in a hydraulic or pneumatic system. The assembly includes a seal ring and elastomer energizer. As a feature of the present invention, the seal ring has a specially shaped interior sealing edge which has an excluder portion adjacent to the exterior edge of the seal ring and a sealing portion located adjacent to the interior edge of the seal ring. The sealing portion of the seal ring includes an apex from which a first surface extends radially towards the seal ring bottom edge and is sloped towards the interior edge of the seal ring at an angle of between about 10° to 40°. A second surface extends axially from this first surface to the interior edge of the seal ring. These two surfaces define an annular vortex channel which creates a vortex that directs hydraulic fluid or gas back into the system during reciprocal movement of the first and second members.

As another feature of the present invention, the interior seal edge is provided with a third surface that extends radially from the seal apex towards the seal ring bottom edge and is sloped towards the exterior edge of the seal ring at an angle of between about 70° to 85°. A fourth surface extends radially from the third surface back to the sealing edge of the sealing ring. The slope of the fourth surface is between about 10° to 40°. The third and fourth surfaces define a hydraulic fluid or gas chamber which traps hydraulic fluid or gas which may leak past the seal apex. As an additional feature of the present invention, the slope angle of the fourth surface is the same as slope angle for the first surface.

Additional features of the present invention involve the use of elastomer energizer rings which are specially designed to provide directed bias to the sealing portion and exclusion portion of the seal ring. A dual element elastomer energizer is disclosed which includes two individual energizer rings wherein one ring is located radially opposite the sealing portion of the seal ring while the other energizer element is located over the exclusion portion. Such a dual element elastomer energizer system provides improved sealing and excluder function. In addition, energizer rings are disclosed having two lobes and four lobes.

The above discussed and many other features and attendant advantages of the present invention will become better understood by reference to the following detailed description when taken in conjunction with the accompanying drawings.

BRIEF DESCRIPTION OF THE DRAWINGS

FIG. 5 is a cross-sectional view of a second preferred exemplary embodiment in accordance with the present invention.

FIG. 6 is a partial sectional view of the FIG. 5 seal assembly shown in position for sealing first and second reciprocating members.

FIG. 7 is a cross-sectional view of a third preferred exemplary embodiment.

FIG. 8 is a cross-sectional view of the FIG. 7 seal shown in position for sealing first and second reciprocating members.

DETAILED DESCRIPTION OF THE INVENTION

The seal assembly of the present invention has wide application for use as a sealing and exclusion device for use in hydraulic and pneumatic systems. The preferred use for the seal assembly is in linear actuators wherein it is necessary to seal hydraulic oil or gas within the system while, at the same time, preventing contaminants from entering the system. The invention also has application to a wide range of other hydraulic or pneumatic devices such as landing gears, shock absorbers and other devices where a sealing and exclusion device is required. The following detailed description will be limited to the sealing of a rod and rod gland, with it being understood that other sealing configurations are possible. For example, the seal assembly may be housed within a groove located in the rod instead of the rod gland as shown in the preferred embodiments.

Figure 1:
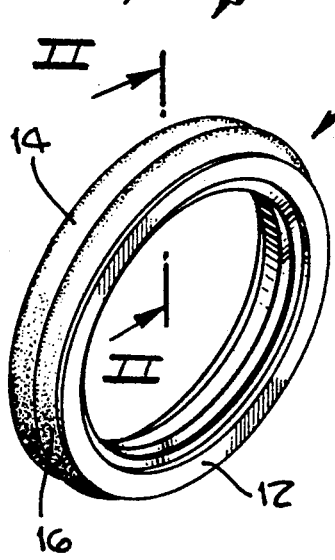
FIG. 1 is a perspective view of a first preferred exemplary seal assembly in accordance with the present invention.
Figure 2:
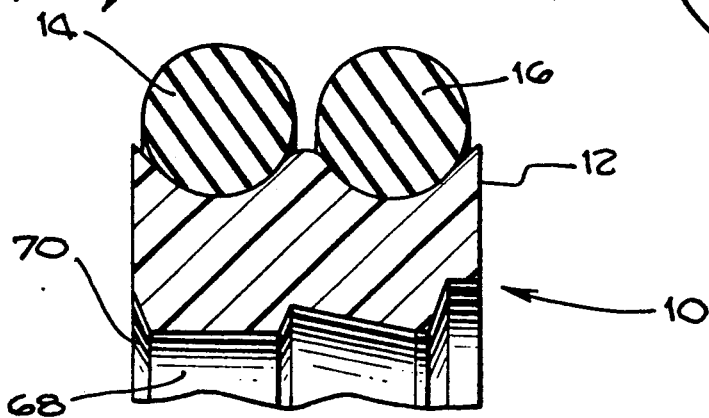
FIG. 2 is a cross-sectional view of FIG. 1 taken in the II—II plane.

Referring to FIGS. 1 and 2, a first exemplary embodiment of the present invention is shown generally at 10. The seal assembly 10 includes a seal ring 12 and two elastomer energizer rings 14 and 16. The seal ring is made from a relatively high modulus plastic material such as urethane or polytetrafluoroethylene (PTFE). The particular material used to make the seal ring is not critical provided that it is a suitable high modulus plastic that provides acceptable sealing characteristics. The elastomer energizer rings 14 and 16 can be made from any suitable elastomer material, such as natural or synthetic rubber or other elastic polymers. The variety of materials used for the seal ring and elastomer energizers are known in the art and do not form part of the invention.

Figure 3:
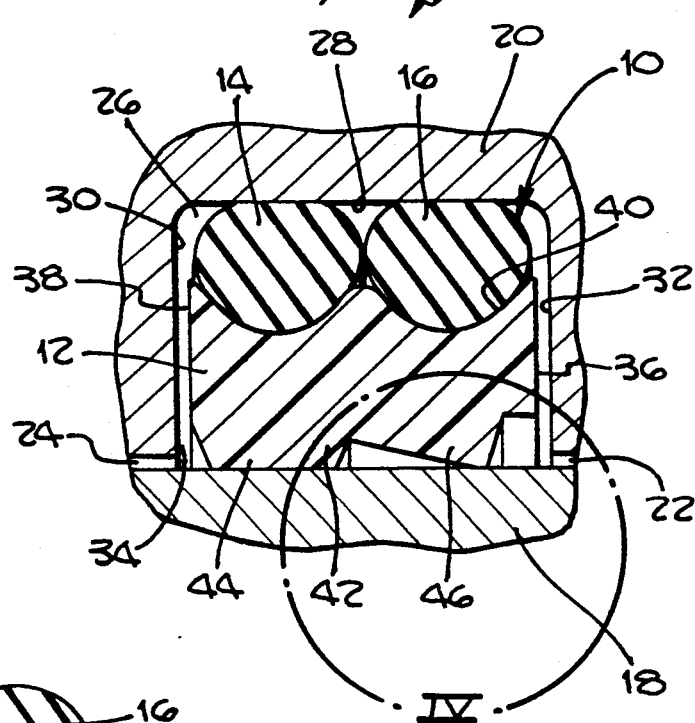
FIG. 3 is a partial sectional view showing the seal assembly of FIGS. 1 and 2 in position for sealing first and second reciprocal members.

In FIG. 3, the seal assembly 10 is shown in position for sealing a rod or first member 18 and a rod gland or second member 20. The first and second members 18 and 20 are reciprocating members, which have an annular space located therebetween. The seal assembly 10 provides sealing of the annular space located between the first and second members.

For the purposes of this description, the annular space between the first and second members is divided into two sections. An annular space 22 is located on the interior side of the seal assembly where the hydraulic fluid or gas reservoir for the system is located; and an annular space 24, which is located on the exterior side of the seal assembly where it is exposed to the atmosphere.

The second member 20 includes an annular groove 26 defining a seal housing in which the seal assembly 10 is located. The seal housing or groove 26 has a bottom 28, sides 30 and 32, and an open top 34.

The seal ring 12 has an interior edge 36, an exterior edge 38, a bottom edge 40 and a top edge 42 for sealing contact with the first member 18. The top edge 42 includes an exclusion portion 44 which is adjacent to the exterior edge 38 and a sealing portion 46 which is located adjacent to the interior edge 36 of the sealing ring. The shape of the sealing portion 46 of the interior edge 36 is a feature of the present invention which will be described in detail by reference to FIG. 4.

Figure 4:
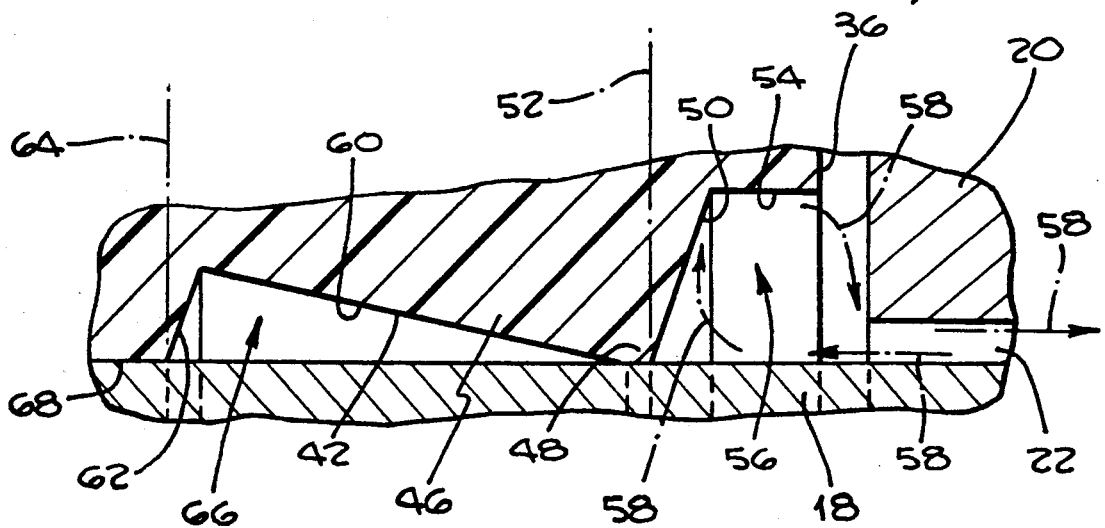
FIG. 4 is a detailed view of the sealing portion of the seal ring shown in FIG. 3.

As shown in FIG. 4, the sealing portion 46 of top edge 42 includes an annular seal apex 48 which provides sealing contact between the seal ring and the first member 18. A first surface 50 extends radially from the apex 48 towards the seal ring bottom edge 40. The first surface 50 is sloped towards the interior edge 36 of the seal ring at an angle of between about 10° to 40°. The angle of slope is measured from the radially extended phantom line 52. A second surface 54 extends axially from the first surface 50 and terminates at the interior edge 36 of the seal ring 12. The first and second surfaces 50 and 54 define an annular vortex channel 56 which directs the hydraulic fluid or gas back into the system during reciprocal movement as shown by arrows 58. This vortex is advantageous because it helps reduce the amount of leakage past the seal apex 48. A slope angle for said first surface of about 20° is preferred.

As another feature of the present invention, a third surface 60 is provided on the top edge 42 of the seal ring 12. The third surface 60 extends radially from the seal apex 48 toward the seal ring bottom edge 40. The third surface 60 is sloped towards the exterior edge 38 of the seal ring at an angle of between about 70° to 85°. The third surface 60 terminates in a fourth surface 62. The fourth surface 62 extends radially from the third surface 60 back to the seal ring top edge 42. The fourth surface 62 is sloped towards the exterior edge 38 at an angle of between about 10° to 40°. The angle of slope for third surface 60 is measured from the radial phantom line 52 while the angle of slope for the fourth surface 62 is measured from radially extending phantom line 64.

The third and fourth surfaces 60 and 62 define a hydraulic fluid or gas chamber 66 which traps any hydraulic fluid or gas which leaks past the seal apex 48. Preferably, the angle of slope of fourth surface 62 is the same as the angle of slope for first surface 50. Accordingly, the preferred angle of slope for fourth surface 62 is about 20°. The preferred angle of slope for the third surface 60 is about 78°.

The particular arrangement of surfaces on the sealing portion 46 is useful in reducing the amount of fluid leakage past the seal apex 48 during both high and low pressure operations. The similar slopes of the first surface 50 and fourth surface 62 generates vortexes of similar character which are useful in preventing leakage of fluid past the seal ring 12.

The exclusion portion 44 of seal ring 12 includes a flat surface 68 which prevents contaminates that enter through annular space 24 from moving past the seal assembly 10. As a feature of the present invention, the exclusion portion 44 includes a chamfer 70 (See FIG. 2). The chamfer 70 reduces the tendency of the exclusion portion 44 from being extruded out through annular opening 24 during reciprocal movement of the first and second members 18 and 20.

A second preferred exemplary embodiment of the present invention is shown generally at 100 in FIGS. 5 and 6. The seal assembly 100 includes a seal ring 102 and an elastomer energizer 104. The seal ring 102 is the same as the seal ring 12 shown in FIGS. 1–4. However, the elastomer energizer 104 is a single element energizer instead of the dual element energizer 14 and 16 shown in the first embodiment. Preferably, the elastomer energizer 104 is of the type disclosed in U.S. Pat. No. 4,448,429. However, other dual lobe elastomer energizers are suitable so long as they provide downward bias for the excluder portion 106 and seal portion 108 of the seal ring 102. In FIG. 6, the seal ring 100 is shown in position for sealing a first member 110 and a second member 112 in the same manner as the first embodiment.

A third preferred exemplary embodiment is shown generally at 120 in FIGS. 7 and 8. The seal assembly 120 also includes a seal ring 122 and an elastomer energizer 124. The seal ring 122 is the same as the seal rings used in the first two embodiments, except that the bottom edge 126 of the seal ring 122 is shaped to receive the lobes of elastomer ring 124. The elastomer ring 124 has a cross sectional shape having four lobes 128, 130, 132 and 134. As was the case with the prior two embodiments, the four-lobed elastomer energizer 124 is designed to provide directed bias to the excluder portion 136 and seal portion 138 of the seal ring. The elastomer rings 104 and 124 are made from the same elastomeric materials used in preparing the elastomer rings of the first embodiment.

In FIG. 8, the seal assembly 120 is shown in position for sealing the annular channel located between a first member 140 and second member 142.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited to the specific embodiments as illustrated herein, but is only limited by the following claims:

What is claimed is:

1. A seal assembly for sealing the annular space between first and second reciprocating members, said second member including an annular groove defining a seal housing for said seal assembly, said seal housing having a bottom, sides and an open top adjacent to said first member, said groove being closed except for said top, said seal assembly being adapted to prevent the escape through said annular groove of hydraulic fluid or gas from a hydraulic fluid or gas reservoir located on an interior side of said seal assembly, said seal assembly also being adapted to exclude the entry into said hydraulic fluid or gas reservoir of contaminants located on an exterior side of said seal assembly, said seal assembly comprising:

a seal ring having an interior edge, an exterior edge, a bottom edge and a top edge for sealing contact with said first reciprocating member, said seal ring being generally rectangular in cross-section, said bottom edge including two grooves therein facing said seal housing bottom, two energizer rings disposed in said respective grooves, said grooves and energizer rings having conforming shapes whereby said energizer rings are located radially between said housing bottom and said seal ring bottom edge for providing directing bias to said seal ring to urge said seal ring top edge against said first reciprocating member, said top edge including an exclusion portion adjacent to said exterior edge and a sealing portion located adjacent to said interior edge, said sealing portion of said top edge comprising:

a) an annular seal apex for sealing contact with said first member;

b) a first surface extending radially from said seal apex towards said seal ring bottom edge and sloped towards said seal interior edge at an angle of between about 10 to 40 degrees relative to a plane of said seal assembly which is perpendicular to the axis of said annular space;

c) a second surface extending axially from said first surface to the interior edge of said seal ring, said first and second surfaces defining an annular a vortex producing means which directs hydraulic fluid or gas back into said reservoir during reciprocal movement of said first and second members;

d) a third surface extending radially from said seal apex towards said seal ring bottom edge and sloped towards said exterior edge at an angle of between about 70 to 85 degrees relative to a plane of said seal assembly which is perpendicular to the axis of said annular space; and a fourth surface extending radially from said third surface back to said seal ring top edge wherein said fourth surface is sloped towards said exterior edge at an angle of between about 10 to 40 degrees relative to a plane of said seal assembly which is perpendicular to the axis of said annular space, wherein said third and fourth surfaces define a hydraulic fluid or gas chamber for trapping hydraulic fluid or gas which leaks past said seal apex.

2. A seal assembly according to claim 1 wherein said energizer rings form a structure with a dual lobe shaped cross-section.

3. A seal assembly according to claim 1 wherein one energizer ring is located radially opposite the exclusion portion of said seal ring and the other energizer ring is located radially opposite the sealing portion of said seal ring.

4. A seal assembly according to claim 1 wherein said energizer rings form a structure with a cross-sectional shape having four lobes.

5. A seal assembly according to claim 1 wherein the angle of slope of said first surface is about 20 degrees relative to a plane of said seal assembly which is perpendicular to the axis of said annular space.

6. A seal assembly according to claim 1 wherein the angle of slope of said first and fourth surfaces is the same relative to a plane of said seal assembly which is perpendicular to the axis of said annular space.

7. A seal assembly according to claim 6 wherein the angle of slope for said first and fourth surfaces is about 20 degrees relative to a plane of said seal assembly which is perpendicular to the axis of said annular space.

8. A seal assembly according to claim 1 wherein the angle of slope of said third surface is about 78 degrees relative to a plane of said seal assembly which is perpendicular to the axis of said annular space.

9. A seal assembly according to claim 1 wherein said seal ring exterior edge is chamfered adjacent to said top edge.

* * * * *